(12) United States Patent
Ben-Tsion et al.

(10) Patent No.: US 9,223,502 B2
(45) Date of Patent: *Dec. 29, 2015

(54) METHOD OF MIGRATING STORED DATA AND SYSTEM THEREOF

(75) Inventors: Ido Ben-Tsion, Ramat Gan (IL); Leo Corry, Ramat Gan (IL); Kariel Sandler, Bat Hefer (IL); Jacob Broido, Tel Aviv (IL)

(73) Assignee: INFINIDAT LTD., Hertzelia (IL)

( * ) Notice: Subject to any disclaimer, the term of this patent is extended or adjusted under 35 U.S.C. 154(b) by 481 days.

This patent is subject to a terminal disclaimer.

(21) Appl. No.: 13/602,998

(22) Filed: Sep. 4, 2012

(65) Prior Publication Data

US 2013/0275447 A1  Oct. 17, 2013

Related U.S. Application Data (63) Continuation-in-part of application No. 13/564,130, filed on Aug. 1, 2012, now Pat. No. 8,856,191.

(60) Provisional application No. 61/513,811, filed on Aug. 1, 2011.

(51) Int. Cl.
G06F 7/00 (2006.01)
G06F 17/30 (2006.01)
G06F 3/06 (2006.01)

(52) U.S. Cl.
CPC .............. *G06F 3/061* (2013.01); *G06F 3/0631* (2013.01); *G06F 3/0689* (2013.01); *G06F 17/303* (2013.01); *G06F 17/30079* (2013.01)

(58) Field of Classification Search
CPC .................. G06F 17/30079; G06F 17/30073; G06F 30/312; G06F 17/30091; G06F 17/30221; G06F 17/30233; G06F 17/303; G06F 3/061; G06F 3/0689; G06F 3/0631; G06F 3/0683; G06F 3/0608
USPC ................... 707/756, 795, 812, 829; 711/111
See application file for complete search history.

(56) References Cited

U.S. PATENT DOCUMENTS

| 5,005,170 A * | 4/1991 | Nelson .................... H04Q 11/04 370/535 |
| 5,030,911 A * | 7/1991 | Lam ....................... G01N 27/908 324/220 |
| 5,220,361 A * | 6/1993 | Lehmer .................. A61B 3/113 351/210 |

(Continued)

*Primary Examiner* — Daniel Kuddus
(74) *Attorney, Agent, or Firm* — Reches Patents (57) ABSTRACT

There is provided a storage system and a method of moving a source data portion from a source logical volume to a destination logical volume. The method comprises: configuring a source mapping data structure to comprise an entry indicative of mapping between logical addresses corresponding to source data portion and addresses corresponding to source data portion and related to a physical address space; and, responsive to a move command, providing an atomic operation comprising configuring a destination mapping data structure to comprise an entry associated with said at least one destination range and comprising a reference to said entry in the source mapping data structure; and configuring said at least one entry in the source mapping data structure $DS_{src}$ to bear an indication that said one or more contiguous ranges of addresses corresponding to said source data portion in the source logical volume $V_{src}$ are unavailable to a client.

20 Claims, 7 Drawing Sheets

(56) References Cited

U.S. PATENT DOCUMENTS

| | | | |
|---|---|---|---|
| 5,544,126 A | 8/1996 | Berryhill | |
| 6,094,686 A * | 7/2000 | Sharma | G06F 12/0811 709/236 |
| 6,145,066 A | 11/2000 | Atkin | |
| 6,147,995 A * | 11/2000 | Dobbins et al. | 370/392 |
| 6,175,837 B1 * | 1/2001 | Sharma et al. | |
| 6,178,482 B1 * | 1/2001 | Sollars | 711/129 |
| 6,198,800 B1 * | 3/2001 | Garland et al. | 378/98.7 |
| 6,311,180 B1 * | 10/2001 | Fogarty | 707/749 |
| 6,487,538 B1 * | 11/2002 | Gupta et al. | 705/14.66 |
| 6,839,827 B1 | 1/2005 | Beardsley et al. | |
| 7,441,096 B2 * | 10/2008 | Kitamura | G06F 3/0605 711/161 |
| 7,523,143 B2 * | 4/2009 | Wong | G06F 17/30575 |
| 2002/0004890 A1 | 1/2002 | Ofek et al. | |
| 2003/0157928 A1 * | 8/2003 | Phillips | H04L 67/325 455/414.1 |
| 2003/0229645 A1 | 12/2003 | Mogi et al. | |
| 2005/0027748 A1 * | 2/2005 | Kisley | G06F 11/2074 |
| 2005/0149536 A1 | 7/2005 | Wildes et al. | |
| 2005/0193180 A1 | 9/2005 | Fujibayashi | |
| 2005/0210218 A1 * | 9/2005 | Hoogterp | G06F 3/0613 711/203 |
| 2005/0216532 A1 | 9/2005 | Lallier | |
| 2005/0283564 A1 | 12/2005 | LeCrone et al. | |
| 2006/0010169 A1 | 1/2006 | Kitamura | |
| 2006/0224844 A1 | 10/2006 | Kano et al. | |
| 2006/0288176 A1 | 12/2006 | Morishita et al. | |
| 2007/0192765 A1 | 8/2007 | Shimogawa et al. | |
| 2007/0220121 A1 | 9/2007 | Suwarna | |
| 2007/0245104 A1 * | 10/2007 | Lindemann | G06F 11/1469 711/162 |
| 2008/0027899 A1 | 1/2008 | Khunteta et al. | |
| 2008/0059744 A1 * | 3/2008 | Ozaki | G06F 3/0605 711/165 |
| 2008/0177947 A1 | 7/2008 | Eguchi et al. | |
| 2009/0077336 A1 * | 3/2009 | Shibayama | G06F 3/0605 711/165 |
| 2009/0125904 A1 | 5/2009 | Nelson | |
| 2010/0017573 A1 | 1/2010 | Shinozaki et al. | |
| 2010/0135983 A1 * | 6/2010 | Hyde | A61K 31/145 424/94.63 |
| 2010/0299666 A1 | 11/2010 | Agbaria et al. | |
| 2011/0060944 A1 | 3/2011 | Kawamura et al. | |
| 2011/0066597 A1 | 3/2011 | Mashtizadeh et al. | |
| 2011/0082997 A1 | 4/2011 | Yochai et al. | |
| 2012/0124331 A1 | 5/2012 | Umemura | |

* cited by examiner

METHOD OF MIGRATING STORED DATA AND SYSTEM THEREOF

CROSS-REFERENCES TO RELATED APPLICATIONS

The present application is a continuation-in-part of U.S. patent application Ser. No. 13/564,130 filed Aug. 1, 2012 and claiming benefit from U.S. Provisional Patent Application No. 61/513,811 filed on Aug. 1, 2011; the entire contents of these applications are hereby incorporated by reference in their entirety.

TECHNICAL FIELD

The presently disclosed subject matter relates, in general, to data storage systems and respective methods for data storage, and, more particularly, to migrating data in the storage system.

BACKGROUND

Minimizing the impact of data migrations on business operations is a critical part of storage management. Technology refresh requiring replacement of older servers or storage arrays with new ones is the major driver of physical data migration. Additionally or alternatively, either because of overall optimization considerations (e.g. CPU usage, memory availability, bandwidth, etc.) or because of configuration modifications (e.g. related to changes in user's privileges, etc.), a decision may come to migrate an application, thus requiring migrating data from one logical volume to another. Wide implementation of Virtual Machines and cloud technologies increases the need for data migration between logical volumes.

The problems of migrating data in the storage systems have been recognized in the conventional art and various systems have been developed to provide a solution, for example:

US Patent Application No. 2011/066597 (Mashtizadeh et al.) discloses a method of migration persistent data of virtual machines. The method includes the steps of copying the persistent data at the source data store to the destination data store, updating a bitmap data structure during the copying step to indicate which blocks of the persistent data have been modified during the copying step, identifying the blocks that have been modified during the copying step using the bitmap data structure, and copying the identified blocks to the destination data store.

US Patent Application No. 2010/299666 (Agbaria et al.) discloses a method for migrating a virtual machine (VM) in a computing environment. The method comprises receiving a request to migrate a VM executing on a source host to a destination host; defining a recovery point to which the VM is restored during recovery from a fault; and iteratively copying a memory of the source host associated with the VM to the destination host. During the copying, the original state of each page in the memory is preserved. At some point, the VM suspends executing on the source host, copies state information associated with the VM to the destination host, and resumes executing on the destination host. If a fault is detected on the source host, the VM is restored to the recovery point using preserved information.

US Patent Application No. 2007/192765 (Shimogawa et al.) discloses a virtual machine system managed by a current host OS virtually operating on hardware. A spare host OS is activated by copying the current host OS to a prescribed memory device using a live migration function when the current host OS is activated, notifies the spare host OS of a request issued to the current host OS via a virtual machine monitor, changes a state of the spare host OS, and switches an OS for managing the virtual machine system from the current host OS to the spare host OS, when the current host OS is in an erroneous state.

US Patent Application No. 2009/125904 (Nelson) discloses migration of a source virtual machine (VM) hosted on a source server to a destination VM on a destination server without first powering down the source VM. After optional pre-copying of the source VM's memory to the destination VM, the source VM is suspended and its non-memory state is transferred to the destination VM; the destination VM is then resumed from the transferred state. The source VM memory is either paged in to the destination VM on demand, or is transferred asynchronously by pre-copying and write-protecting the source VM memory, and then later transferring only the modified pages after the destination VM is resumed. The source and destination servers preferably share common storage, in which the source VM's virtual disk is stored; this avoids the need to transfer the virtual disk contents. Network connectivity is preferably also made transparent to the user by arranging the servers on a common subnet, with virtual network connection addresses generated from a common name space of physical addresses.

US Patent Application No. 2007/220121 (Suwarna) discloses a virtual machine migrated between two servers. A method, at the first server, dismounts a volume on which all the files relating to the virtual machine are stored, and which was previously mounted at the first server. The method, at the second server, mounts the volume on which all the files relating to the virtual machine are stored, so that the second server can host the virtual machine. In this way, the virtual machine can be migrated without having to copy all the files from the first server to the second server. The files relating to the virtual machine are stored on a storage-area network (SAN).

US Patent Application No. 2005/283564 (LeCrone et al.) discloses a method and apparatus for migrating one or more data sets each having one or more extents from one or more source logical devices to one or more target logical devices concurrently with interaction between the application and the data being migrated. A background operation copies each extent from the source logical device to the target logical device in a copy state. When a certain level of data has been copied, the extent is locked to assure synchronization of the data in the target logical device to the corresponding data in the source logical device. The status is changed to a mirrored state. When the extents for a data set in a source logical device or in a group of data sets have been mirrored, all the extents are changed to a diverted state. I/O requests to the diverted extents thereafter are intercepted and processed according to whether they access an extent that is in the copy, mirrored, or diverted state.

U.S. Pat. No. 6,145,066 (Atkin) discloses a computer system including a transparent data migration facility (TDMf) to accomplish automated movement of data (migration) from one location to another in the system. A data migration program includes a main module to control the start of a migration session when said application programs are using data accessed to and from the source volume, to migrate data from the source volume to the target volume, and to end the migration session whereby the application programs are using data accessed to and from the target volume. The data migration program includes a volume module to control the volumes during the migration session. The data migration program includes a copy module to control the copying of data from the source module to the target module during the migration session. The data migration program includes a monitor module for monitoring I/O transfers to the data volumes during the migration sessions. The computer system may have a plurality of operating systems associated with instances of the data migration program which allows for concurrent data migrations. The plurality of instances of the data migration program may also be controlled in a master slave relationship. A migration session may include a plurality of migration phases such as activation, copy, refresh, synchronize, redirect, resume and termination phases.

BRIEF SUMMARY OF THE INVENTION

In accordance with certain aspects of the presently disclosed subject matter, there is provided a method of moving at least one source data portion from a source logical volume Vsrc to at least one destination range in at least one destination logical volume Vdest thereby giving rise to at least one moved data portion in said at least one destination logical volume Vdest. The method comprises:

configuring a source mapping data structure DSsrc associated with the source logical volume Vsrc to comprise at least one entry associated with said at least one source data portion and indicative of mapping between one or more contiguous ranges of addresses corresponding to said at least one source data portion in the source logical volume Vsrc and one or more ranges of addresses corresponding to said at least one source data portion and related to a physical address space; and responsive to a move command, providing an atomic operation comprising:

configuring a destination mapping data structure DSdest associated with said at least one destination logical volume Vdest to comprise at least one entry associated with said at least one destination range and comprising a reference to said at least one entry in the source mapping data structure DSsrc, said at least one entry in the source mapping data structure DSsrc to be used for mapping to addresses related to physical address space and corresponding to the source data portion and to the moved data portion; and configuring said at least one entry in the source mapping data structure DSsrc to bear an indication that said one or more contiguous ranges of addresses corresponding to said at least one source data portion in the source logical volume Vsrc are unavailable to a client.

The method can further comprise addressing a request related to said moved data portion received by said destination mapping data structure DSdest to said at least one entry in the source mapping data structure DSsrc.

In accordance with further aspects of the presently disclosed subject matter, the destination mapping structure DSdest can be configured as a destination ordered mapping tree TRdest, wherein said at least one entry in the destination mapping structure DSdest can be implemented as a leaf of said destination mapping tree TRdest, said leaf bearing, upon receiving the move command, a reference to said at least one entry associated with said source data portion in the source mapping structure DSsrc.

In accordance with further aspects of the presently disclosed subject matter, the method can further comprise associating said at least one source data portion with a multiple-reference indication indicative of a number of moved data portions in one or more destination volumes, said moved data portions mapped to the addresses related to physical address space with the help of said at least one entry associated with the source data portion in the source mapping data structure.

The indication can be provided with the help of a reference counter associated with the source mapping data structure DSsrc and with one or more destination mapping structures DSdest associated with said one or more destination volumes.

In accordance with further aspects of the presently disclosed subject matter, the source mapping structure DSsrc can be configured as a source ordered mapping tree TRsrc, and said at least one entry in the source mapping structure DSsrc can be implemented as a leaf of the tree TRsrc.

The leaves in the source and the destination mapping trees can be associated with a multiple-reference indication indicative of a number of moved data portions in one or more destination volumes, said portions mapped to the addresses related to physical address space with the help of said leaves.

In accordance with further aspects of the presently disclosed subject matter, the method can further comprise: responsive to a command issued by the storage system to delete said at least one source data portion, providing an atomic operation, said atomic operation comprising:

updating said at least one entry in the destination mapping structure DSdest to map between said at least one destination address range and addresses related to physical address space and referred to, before updating, via said at least one entry in the source data structure DSsrc, wherein, upon updating, said mapping is provided without referencing to the source mapping structure; deleting said at least one entry in the source mapping structure DSsrc; and updating the value of multiple-reference indication associated with said at least one moved data portion.

In accordance with further aspects of the presently disclosed subject matter, the method can further comprise: responsive to a write request related to said at least one moved data portion, providing an atomic operation, said atomic operation comprising: assigning a new range of addresses related to physical address space for new data to be destaged; updating said at least one entry in the destination mapping structure DSdest to map between said at least one destination address range and said new addresses related to physical address space and corresponding to the moved data portion, wherein said mapping is provided without referencing to the source mapping structure; and reducing by one the value of multiple-reference indication associated with said at least one source data portion.

In accordance with further aspects of the presently disclosed subject matter, move operations for a plurality of source data portions constituting a logical object can be provided as a single atomic operation.

In accordance with other aspects of the presently disclosed subject matter, there is provided a storage system comprising a plurality of physical storage devices constituting a physical storage space and controlled by a plurality of storage control devices constituting a storage control layer, wherein the storage control layer is operable to enable moving at least one source data portion from a source logical volume Vsrc to at least one destination range in at least one destination logical volume Vdest thereby giving rise to at least one moved data portion in said at least one destination logical volume Vdest. The storage control layer further comprises:

a source mapping data structure DSsrc configured to comprise at least one entry associated with said at least one source data portion and indicative of mapping between one or more contiguous ranges of addresses corresponding to said at least one source data portion in the source logical volume Vsrc and one or more ranges of addresses corresponding to said at least one source data portion and related to a physical address space; and a destination mapping data structure DSdest configured to comprise at least one entry associated with said at least one destination range and indicative of mapping between said at least one destination range and one or more ranges of corresponding addresses related to the physical address space;

wherein said storage control layer is further operable to provide an atomic command comprising:

configuring, responsive to a move command, said at least one entry in the destination mapping data structure DSdest to comprise a reference to said at least one entry in the source mapping data structure DSsrc, said at least one entry in the source mapping data structure DSsrc is configured to be used for mapping to the addresses related to physical address space and corresponding to the moved data portion and to the source data portion; and configuring said at least one entry in the source mapping data structure DSsrc to bear an indication that said one or more contiguous ranges of addresses corresponding to said at least one source data portion in the source logical volume Vsrc are unavailable to a client.

In accordance with further aspects of the presently disclosed subject matter, the system of can further comprise a plurality of virtual machines, wherein the logical volumes Vsrc and Vdest are associated with different virtual machines.

In accordance with further aspects of the presently disclosed subject matter, the storage control layer can be further configured to provide associating said at least one source data portion and said at least one moved data portion with a multiple-reference indication indicative of a number of moved data portions in one or more destination volumes, said moved data portions mapped to the addresses related to physical address space with the help of said at least one entry associated with the source data portion in the source mapping data structure.

In accordance with further aspects of the presently disclosed subject matter, the system can further comprise a reference counter associated with the source mapping data structure DSsrc and with the destination mapping structure DSdest and configured to provide multiple-reference indication.

The source mapping structure DSsrc is configured as a source ordered mapping tree TRsrc, and wherein said at least one entry in the source mapping structure DSsrc is implemented as a leaf of the tree TRsrc. The leaves in the source and the destination mapping trees are associated with a multiple-reference indication indicative of a number of moved data portions in one or more destination volumes, said portions mapped to the addresses related to physical address space with the help of said leaves.

In accordance with further aspects of the presently disclosed subject matter, the storage control layer can be further configured to provide an atomic operation responsive to a command issued by the storage system to delete said at least one source data portion, said atomic operation comprising:

updating said at least one entry in the destination mapping structure DSdest to map between said at least one destination address range and addresses related to physical address space and referred to, before updating, via said at least one entry in the source data structure DSsrc, wherein, upon updating, said mapping is provided without referencing to the source mapping structure; deleting said at least one entry in the source mapping structure DSsrc; and updating the value of multiple-reference indication associated with said at least one moved data portion.

In accordance with further aspects of the presently disclosed subject matter, the storage control layer can be further configured to provide an atomic operation responsive to a write request related to said at least one moved data portion, said atomic operation comprising: assigning a new range of addresses related to physical address space for new data to be destaged; updating said at least one entry in the destination mapping structure DSdest to map between said at least one destination address range and said new addresses related to physical address space and corresponding to the moved data portion, wherein said mapping is provided without referencing to the source mapping structure; and updating the value of multiple-reference indication associated with said at least one source data portion and with said at least one moved data portion.

Among advantage of certain embodiments of the presently disclosed subject matter is the ability of moving data from a logical volume to another logical volume (e.g. related to different filesystems and/or different Virtual Machines), whilst eliminating a need of using host resources as well as eliminating a need of physically copying data from one location to the other, thereby reducing consumption of host and storage resources including the cache and internal bandwidth.

DETAILED DESCRIPTION OF THE INVENTION

In order to understand the disclosed subject matter and to see how it can be carried out in practice, embodiments will now be described, by way of non-limiting example only, with reference to the accompanying drawings, in which.

DETAILED DESCRIPTION OF EMBODIMENTS

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "computing", "calculating", "determining", "generating", "writing", "selecting", "allocating", "storing", "managing" or the like, refer to the action and/or processes of a computer that manipulate and/or transform data into other data, said data represented as physical, such as electronic, quantities and/or said data representing the physical objects. The term "computer" should be expansively construed to cover any kind of electronic system with data processing capabilities, including, by way of non-limiting example, storage system and parts thereof disclosed in the present applications.

The operations in accordance with the teachings herein may be performed by a computer specially constructed for the desired purposes or by a general-purpose computer specially configured for the desired purpose by a computer program stored in a computer readable storage medium.

Embodiments of the presently disclosed subject matter are not described with reference to any particular programming language. It will be appreciated that a variety of programming languages may be used to implement the teachings of the presently disclosed subject matter as described herein.

The references cited in the background teach many principles of migrating data in storage systems that are applicable to the presently disclosed subject matter. Therefore the full contents of these publications are incorporated by reference herein where appropriate for appropriate teachings of additional or alternative details, features and/or technical background.

In the drawings and descriptions, identical reference numerals indicate those components that are common to different embodiments or configurations.

Figure 1:
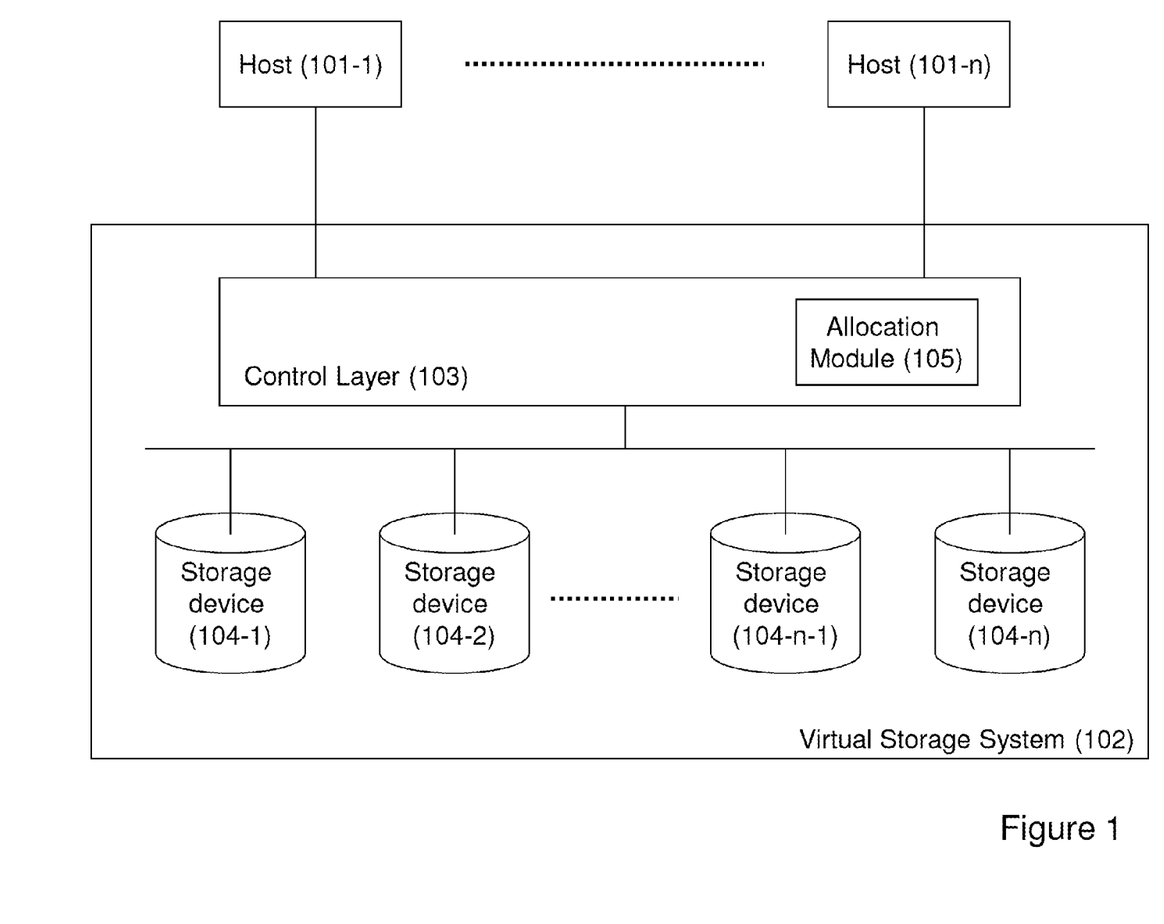
FIG. 1 illustrates a schematic functional block diagram of an exemplary storage arrangement in accordance with certain embodiments of the presently disclosed subject matter.

Bearing this in mind, attention is drawn to FIG. 1 illustrating an exemplary storage environment in accordance with certain embodiments of the presently disclosed subject matter.

The computer system comprises a plurality of host computers (workstations, application servers, etc.) illustrated as 101-1-101-$n$ sharing common storage means provided by one or more virtualized storage systems. The illustrated storage system 102 comprises a storage control layer 103 comprising one or more appropriate storage control devices operatively coupled to the plurality of host computers and a plurality of data storage devices 104-1-104-$n$ constituting a physical storage space optionally distributed over one or more storage nodes. The storage control layer 103 is operable to control interface operations (including I/O operations) between host computers and the plurality of storage devices. The storage control layer is further operable to handle a virtual representation of physical storage space and to facilitate necessary mapping between the physical storage space and its virtual representation. The virtualization functions can be provided in hardware, software, firmware or any suitable combination thereof. Optionally, the functions of the control layer can be fully or partly integrated with one or more host computers and/or storage devices and/or with one or more communication devices enabling communication between the hosts and the storage devices. Optionally, a format of logical representation provided by the control layer may differ, depending on interfacing applications.

The physical storage space can comprise any appropriate permanent storage medium and include, by way of non-limiting example, one or more disk drives and/or one or more disk units (DUs). The physical storage space comprises a plurality of data blocks, each data block can be characterized by a pair ($DD_{id}$, DBA), and where $DD_{id}$ is a serial number associated with the disk drive accommodating the data block, and DBA is a logical block number within the respective disk. By way of non-limiting example, $DD_{id}$ can represent a serial number internally assigned to the disk drive by the system or, alternatively, a WWN or universal serial number assigned to the disk drive by a vendor. The storage control layer and the storage devices can communicate with the host computers and within the storage system in accordance with any appropriate storage protocol.

Stored data can be logically represented to a client (e.g. a user, an application, etc.) in terms of logical storage devices referred to hereinafter also as logical units, logical volumes or volumes. A logical unit (LU) is a virtual entity logically presented to a client as a single virtual storage device. The logical volume represents a plurality of data blocks characterized by successive Logical Block Addresses (LBA) ranging from 0 to a number LUK. Different LUs can comprise different numbers of data blocks, while the data blocks are typically of equal size (e.g. 512 bytes). Blocks with successive LBAs can be grouped into portions that act as basic units for data handling and organization within the system. Thus, for instance, whenever space has to be allocated on a disk or on a memory component in order to store data, this allocation can be done in terms of data portions also referred to hereinafter as "allocation units". Data portions are typically of equal size throughout the system (by way of non-limiting example, the size of a data portion can be 64 Kbytes).

When receiving a write request from a host, the storage control layer defines a physical location(s) for writing the respective data (e.g. a location designated in accordance with an allocation scheme, preconfigured rules and policies and/or location available for a log-structured storage, etc.) and further processes the request accordingly. When receiving a read request from the host, the storage control layer obtains the physical location(s) of the desired data and further processes the request accordingly.

Mapping between logical and physical locations of data portions and/or groups thereof is further detailed with reference to FIGS. 2-7. Addresses related to logical locations can be mapped into addresses related to the physical locations with the help of the allocation module 105 operable to provide necessary address translation. The allocation module can be implemented as a centralized module operatively connected to the plurality of storage control devices or can be, at least partly, distributed over a part or all storage control devices.

Logical objects (e.g. data files, multimedia files, database tables, filesystems, etc.) stored in a logical volume $V_{src}$ can be migrated to logical volume $V_{dest}$. The migration may be useful in scenarios involving duplication of virtual hosts or of applications running in a virtual machine environment. In such cases, migration of whole or part of logical volumes may be necessary. Additional scenarios may involve duplicating data for databases backup, filesystem backup, large file cloning, etc.

Optionally, each host can comprise a plurality of virtual machines (not shown). An application from a first virtual machine VM1 running in a host $H_j$ can be migrated to a second virtual machine VM2 running in a host $H_k$. In this case $H_j$ and $H_k$ could be the same host. Files (or other logical objects) related to the application, currently stored in an associated volume $V_{src}$ and owned by a file system FS1 associated with VM1 will be migrated to a file system FS2 associated with VM2 and to be stored in volume V2.

In general, the migration operation can enable independent I/O operations on the data portion in the source volume $V_{src}$ and the respective data portion in the destination volume $V_{dest}$. On the other hand, there can be a need to disable operations on the data portion in volume $V_{src}$ from the moment when the respective data portion in volume $V_{dest}$ is available for I/O operations by client. Such migration of a source data portion with further disabling clients' access to the logical addresses therein is referred to hereinunder as moving the data portion.

The presently disclosed subject matter is not bound by the specific architecture illustrated with reference to FIG. 1, equivalent and/or modified functionality can be consolidated or divided in another manner and can be implemented in any appropriate combination of software, firmware and hardware. The control layer and/or parts thereof can be implemented as suitably programmed computer(s).

Figure 2:
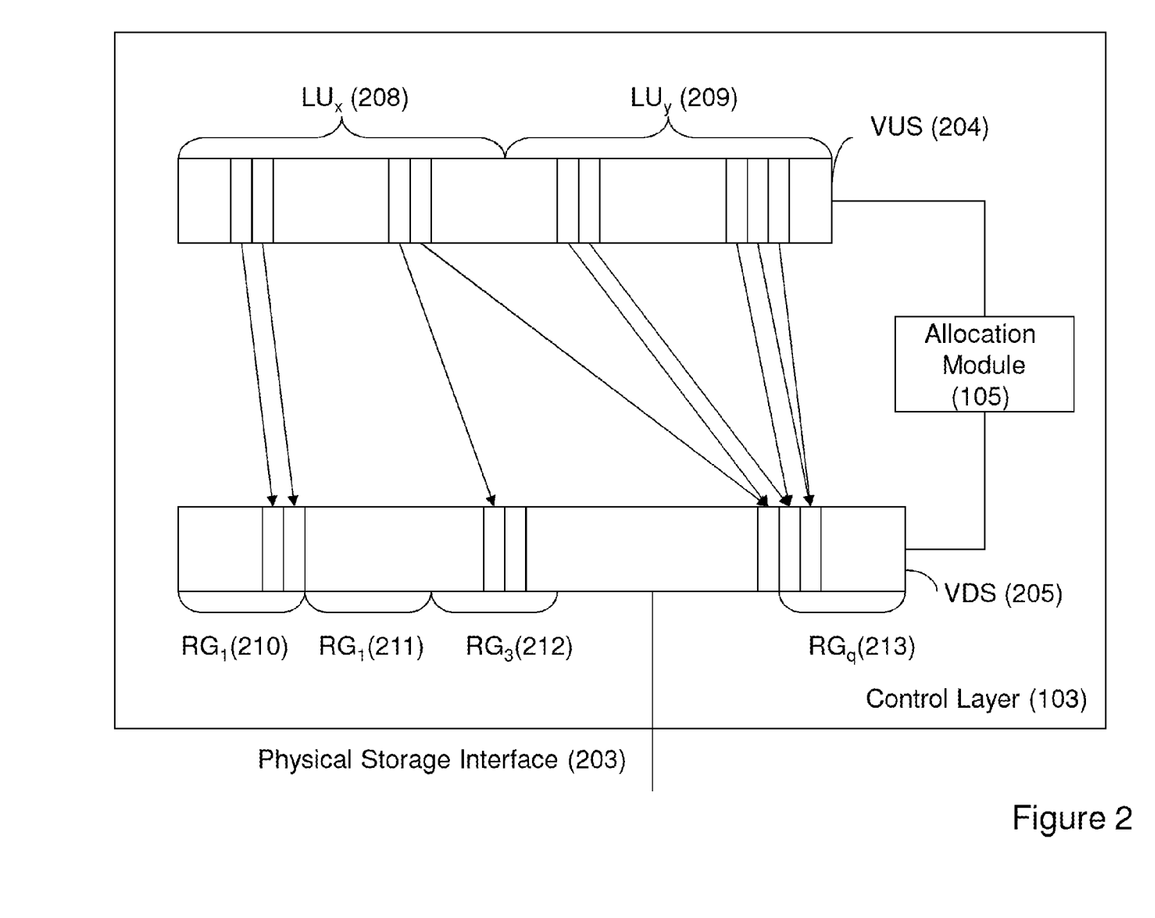
FIG. 2 illustrates a schematic functional block diagram of a control layer configured in accordance with certain embodiments of the presently disclosed subject matter.

Referring to FIG. 2, there is illustrated a schematic functional diagram of the control layer configured in accordance with certain embodiments of the presently disclosed subject matter. The illustrated configuration is further detailed in U.S. application Ser. No. 12/897,119 filed Oct. 4, 2010, assigned to the assignee of the present application and incorporated herein by reference in its entirety.

The virtual presentation of the entire physical storage space can be provided through creation and management of one or more virtualization layers. By way of non-limiting example, the illustrated control layer comprises two interconnected virtualization layers: a first virtual layer 204 operable to represent logical units available to clients (workstations, applications servers, etc.) and characterized by a Virtual Unit Space (VUS); and a second virtual layer 205 interfacing with the physical storage space via a physical storage interface 203. The logical units are represented in VUS as virtual data blocks characterized by virtual unit addresses (VUAs). The second virtual layer 205 is operable to represent the physical storage space available to the clients and is characterized by a Virtual Disk Space (VDS). By way of non-limiting example, storage space available for clients can be calculated as the entire physical storage space less reserved parity space and less spare storage space. The virtual data blocks are represented in VDS with the help of virtual disk addresses (VDAs). Virtual disk addresses are substantially statically mapped into addresses in the physical storage space. This mapping can be changed responsive to modifications of physical configuration of the storage system (e.g. because of disk failure or disk addition). The VDS can be further configured as a concatenation of representations (illustrated as 210-213) of RAID groups.

Addresses in VUS can be dynamically mapped into addresses in VDS with the help of the allocation module 105 operable to provide translation from VUA to VDA via Virtual Address Mapping.

By way of non-limiting example, FIG. 2 illustrates a part of the storage control layer corresponding to two LUs illustrated as LUx (208) and LUy (209). The LUs are mapped into the VUS. In a typical case, initially the storage system assigns to a LU contiguous addresses (VUAs) in VUS. However, existing LUs can be enlarged, reduced or deleted, and some new ones can be defined during the lifetime of the system. Accordingly, the range of contiguous data blocks associated with the LU can correspond to non-contiguous data blocks assigned in the VUS. The parameters defining the request in terms of LUs are translated into parameters defining the request in the VUAs, and parameters defining the request in terms of VUAs are further translated into parameters defining the request in the VDS in terms of VDAs and further translated into physical storage addresses.

Translating addresses of data blocks in LUs into addresses (VUAs) in VUS can be provided independently from translating addresses (VDA) in VDS into the physical storage addresses. Such translation can be provided, by way of non-limiting examples, with the help of an independently managed VUS allocation table and a VDS allocation table handled in the allocation module 105 as further detailed in U.S. application Ser. No. 12/897,119. Different blocks in VUS can be associated with one and the same block in VDS. Optionally, allocation of physical storage space can be provided only responsive to destaging respective data from the cache memory to the disks (e.g. for snapshots, thin volumes, etc.).

By way of non-limiting example, the Virtual Address Mapping can be provided with the help of one or more mapping data structures, for example configured as mapping trees detailed in U.S. application Ser. No. 12/897,119.

Figure 3:
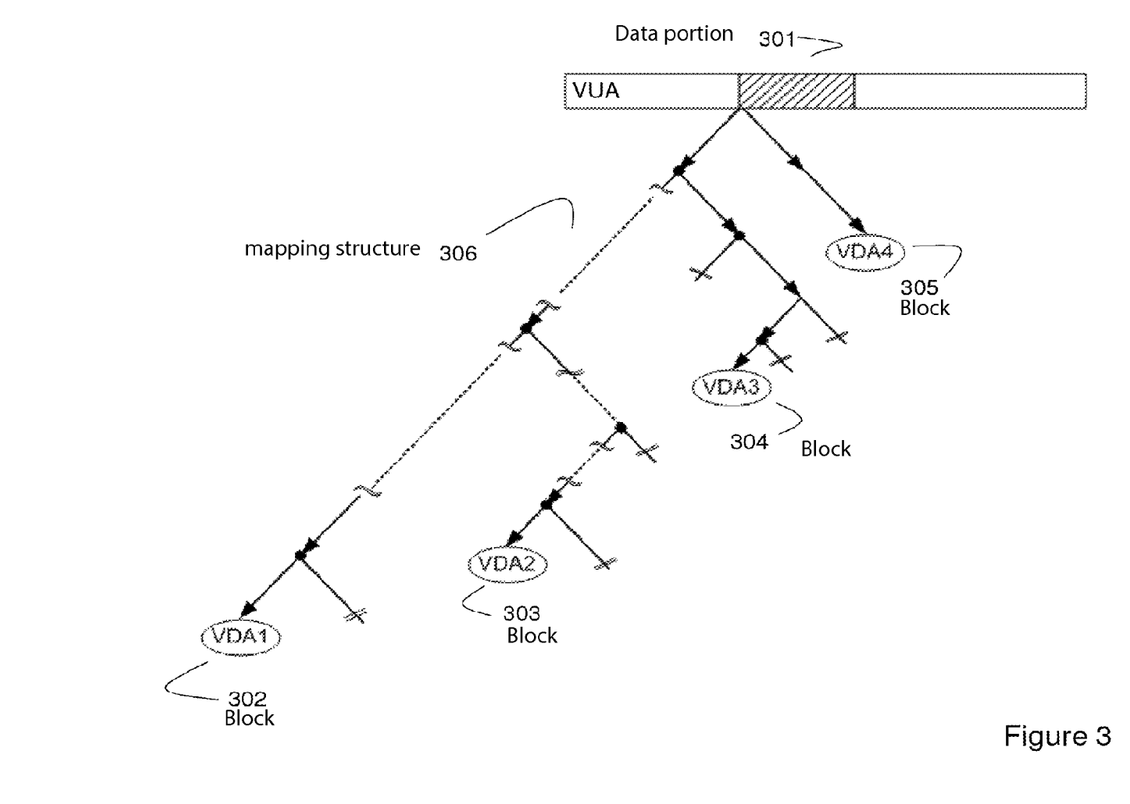
FIG. 3 schematically illustrates a non-limiting example of a mapping tree.

A non-limiting example of the mapping structure is illustrated in FIG. 3. For purpose of illustration only, the following description is provided for mapping trie(s) configured to provide mapping between VUA and VDA addresses. It should be noted that mapping between addresses related to logical volumes (LBA, VUA) and addresses (VDA, DBA) related to the physical address space can comprise at least one of the following mapping options: mapping between LBA and DBA addresses; mapping between VUA and VDA addresses; mapping between LBA and VDA addresses; and mapping between VUA and DBA addresses. When in some following examples a VUA offset is denoted as LBA address, it should be interpreted as VUA address corresponding to respective LBA address. Those skilled in the art will further readily appreciate that the presently disclosed subject matter is not bound by mapping with the help of mapping trees and can be implemented, likewise, with the help of any other appropriate mapping structure (e.g. mapping tables with respective entries and references therebetween). The mapping tree can be configured as an ordered tree (trie) data structure comprising one or more leaves wherein a) a depth of a leaf in the tree represents a length of a contiguous range of addresses related to a given corresponding logical group; b) a given path followed from a tree root to the leaf indicates an offset of the respective range of addresses within the given logical group; c) a value associated with the leaf indicates an offset of respective contiguous range of addresses related to the physical storage space and corresponding to said contiguous range of addresses related to said given logical group.

The depth of a given leaf can be configured in inverse relation to the length of respective contiguous range of addresses related to a respective logical group. A sequential number of a given leaf node can be calculated as D−1, wherein D is equal to a maximal admissible number of addresses related to the physical storage space divided by a number of contiguous addresses in the range of addresses related to the logical group.

The path followed from a tree root to the leaf can be represented as a string of zeros and ones depending on right and/or left branches comprised in the path. The offset of the respective range of addresses within the given logical group can be calculated in accordance with the path followed from the tree root to the leaf with the help of the following expression:

$$\sum_{i=0}^{d-1} r_i \cdot 2^{(M-i-1)}$$

where M is the power of two in the maximal number of admissible addresses in the given logical group, d is the depth of the leaf, i=0, 1, 2, 3, d−1 are the successive nodes in the tree leading to the leaf, and $r_i$ is a value equal to zero for one-side branching and equal to one for another side branching.

The mapping tree can comprise at least one leaf with at least two associated values, said associated values indicating offsets of two different contiguous ranges of addresses related to the physical storage space and corresponding to the same contiguous range of addresses related to the logical address space.

As illustrated by way of non-limiting example in FIG. 3, successive addresses in VUA can be mapped in several groups of successive VDA addresses. A data portion 301 in VUA is mapped to four different portions of successive blocks (302-305) in VDS. Mapping between VUA and VDS addresses is provided with the help of mapping structure 306 configured, by the way of non-limiting example as a mapping trie. Each VDS successive block starts at the address specified in the respective leaf and has a length corresponding to the depth of the branch, as was detailed above.

Figure 4:
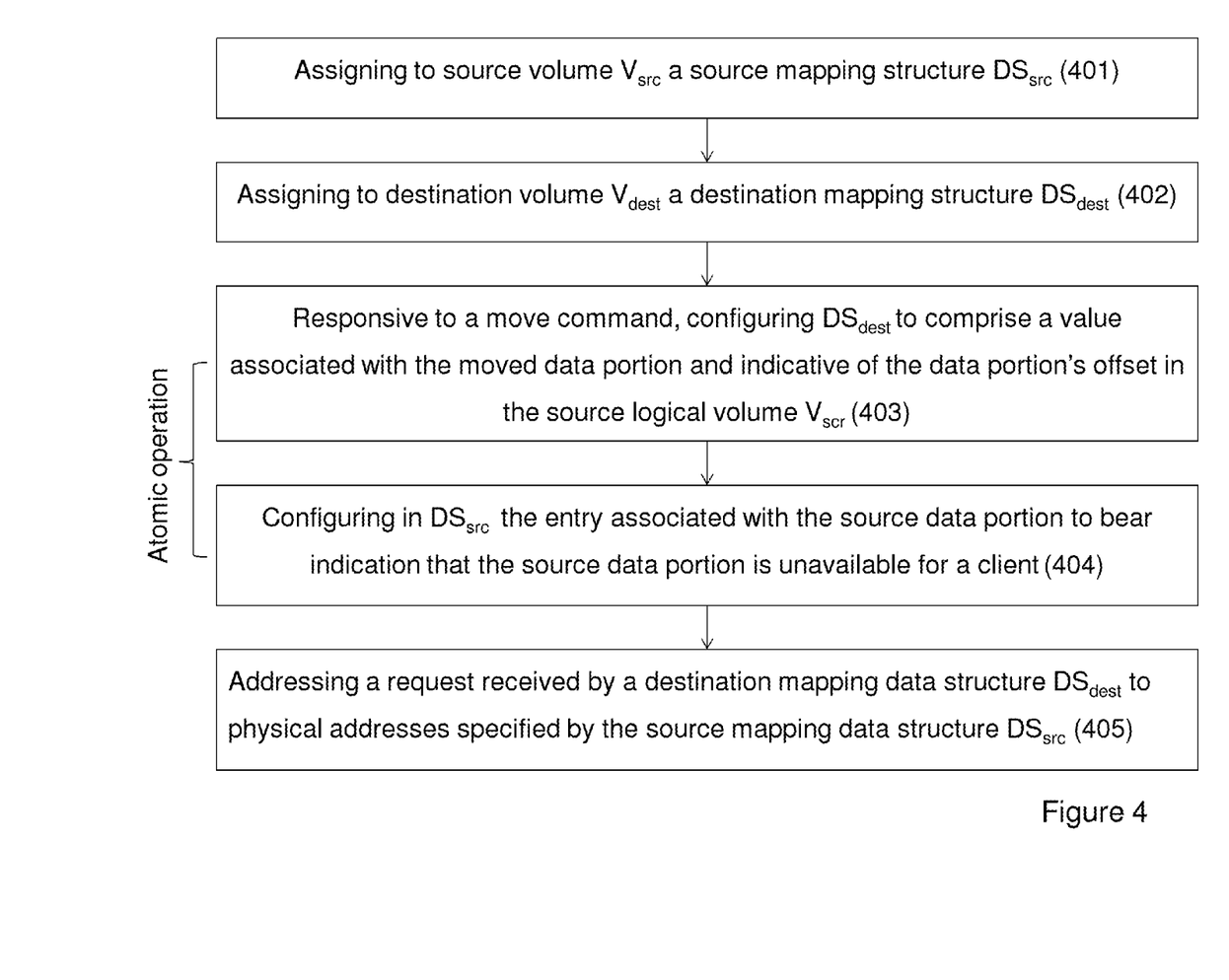
FIG. 4 illustrates a generalized flow diagram of a moving process in accordance with certain embodiments of the presently disclosed subject matter.

Bearing the above in mind, attention is drawn to FIG. 4 illustrating a method of moving at least one data portion from a source logical volume $V_{src}$ to one or more destination logical volumes $V_{dest}$ in accordance with certain embodiments of the presently disclosed subject matter.

Operations detailed with reference to FIGS. 4-7 can be provided with the help of the allocation module 105 or one or more modules in the control layer specially configured for the desired purposes (e.g. migration module, background module, etc.).

A move operation comprises migration of a data portion having length $LGT_x$ and starting at a logical block address $LBA_x$ in volume $V_{src}$ to logical block address $LBA_y$ in volume $V_{dest}$, this migration followed by disabling clients' access to the respective logical addresses of the source data portion. The operation of moving the data portion can be described by a MOVE function MOVE ($V_{dest}$, $LBA_y$, $V_{src}$, $LBA_x$, $LGT_x$).

The data portion to be moved (also referred to hereinafter as the source data portion) is characterized by length $LGT_x$ and offset $LBA_x$ in a source logical volume $V_{src}$ and offset $LBA_y$ in the destination volume $V_{dest}$. For purpose of illustration only, it is assumed that the moved data portion is an extent of file F. The file F is owned by a filesystem $FS_{src}$ associated with a logical volume $V_{src}$. File F is to be moved to a file system $FS_{dest}$, associated with a logical volume $V_{dest}$. If file F spans more than one extent of successive blocks within $V_{src}$, the respective data portions (extents) can be moved separately (e.g. one after the other) as part of an atomic operation of moving the file. By way of non-limiting example, the moved data portion can be an extent of a file F stored in volume $V_{src}$ related to a file system FS1 associated with a virtual machine VM1, this file to be moved to volume $V_{dest}$ related to a file system FS2 associated with VM2 running on the same host.

Those skilled in the art will readily appreciate that the presently disclosed subject matter is not bound by moving the file extents and/or moving in virtual machine environment, and can be implemented, likewise, for moving the data portions and groups thereof belonging to any logical objects from a source logical volume to a destination logical volume.

The technique provided in accordance with certain embodiments of the currently presented subject matter, enables virtual moving the source data portion from logical volume $V_{src}$ to logical volume $V_{dest}$ with neither need in physical copying any data nor need in host involvement in the moving process. The virtual copying is followed by disabling client's access to the source instance of the data portion.

In accordance with certain embodiments of the presently disclosed subject matter, the storage control layer is configured (401) to comprise a source mapping data structure $DS_{src}$ assigned to the source logical volume $V_{src}$. The source mapping data structure is configured to map between one or more contiguous ranges of addresses related to the source logical volume and one or more contiguous ranges of addresses related to corresponding physical address space. The source data structure comprises at least one entry corresponding to a source logical address range associated with data portions (extents) to be moved and indicative of respective ranges of addresses related to the physical address space and corresponding to the data portions. By way of non-limiting example, the source mapping data structure can be configured as an ordered tree $TR_{src}$ comprising one or more leaves (entries) corresponding to the data portion to be moved. The values associated with these leaves indicate respective ranges of addresses related to the physical address space and corresponding to the data portion to be moved.

The storage control layer is further configured (402) to comprise a destination mapping data structure $DS_{dest}$ assigned, respectively, to the destination volume $V_{dest}$. The destination mapping data structure is configured to map between one or more contiguous ranges of addresses related to the destination logical volume and one or more contiguous ranges of addresses related to the corresponding physical address space.

Responsive to a move command, the destination mapping data structure $DS_{dest}$ is configured (403) to comprise an entry that includes a destination logical address range associated with the moved data portion and a reference to the source data structure, wherein the reference comprises an indication of the source logical address associated with the source data portion in the source logical volume $V_{scr}$ before moving. In the source data structure $DS_{src}$, these one or more entries associated with the source data portion are provided (404) with assigned indication of unavailability of these one or more contiguous ranges of addresses corresponding the source data portion in the source logical volume $V_{src}$ to a client. The operations 403 and 404 are provided as a single atomic operation, i.e. operation that either succeeds or fails in its entirety and not in a partial way.

The indication of unavailability can be provided in any appropriate way enabling the control layer to receive the indication when addressing, directly or indirectly, the source data structure $DS_{src}$ for mapping information in connection with serving a respective client's request. Upon receiving the indication of unavailability, the control layer will enable declining the request.

Thus a request related to the moved data portion in the destination volume will be addressed (405) by the destination mapping data structure $DS_{dest}$ to the respective entry in the source mapping data structure $DS_{src}$ capable of further translating the request into addresses related to physical address space. Upon receiving an I/O request addressed to the moved (destination) data portion in the destination volume $V_{dsts}$, the destination mapping data structure $DS_{dest}$ is looked up by the destination logical address to retrieve a reference to the source data structure indicative of the source logical address. In the source mapping data structure $DS_{src}$, the source logical address associated with the source data portion is further looked up to retrieve the actual physical address. An I/O request addressed to the source data portion will be received by the source mapping tree $TR_{src}$, looked up by the source logical address and declined in accordance with unavailability indication assigned to the source data portion. Thus, the source data portion is virtually moved to the destination logical volume.

The destination mapping data structure can be configured as an ordered tree $TR_{dest}$ configured to map between one or more contiguous ranges of addresses related to the destination logical volume and one or more contiguous ranges of addresses related to corresponding physical address space. Responsive to a move command, the destination mapping tree $TR_{dest}$ is configured to include a leaf corresponding to the moved data portion, wherein a value associated with said leaf indicates the source logical volume $V_{scr}$ and the offset of the data portion therein before moving. Thus, a request related to the moved data portion and received by a destination mapping tree $TR_{dest}$ will be addressed to the source mapping tree $TR_{src}$ according to the value associated with the leaf. The source mapping tree will provide further translating the request into addresses related to physical address space. The respective one or more leaves in the source mapping tree $TR_{src}$ are configured to bear indication that the source data portion is unavailable to a client.

Likewise, if the source data portion needs to be moved to several destination volumes, the operations above are provided for each destination volume and associated data structures. Optionally, moving to multiple destination volumes can be provided as a single atomic operation.

It is to be noted that the disclosed operation of moving a data portion between logical volumes can be considered as a virtual move as it does not alter addresses corresponding to the data portion and related to the physical address space.

Figure 5:
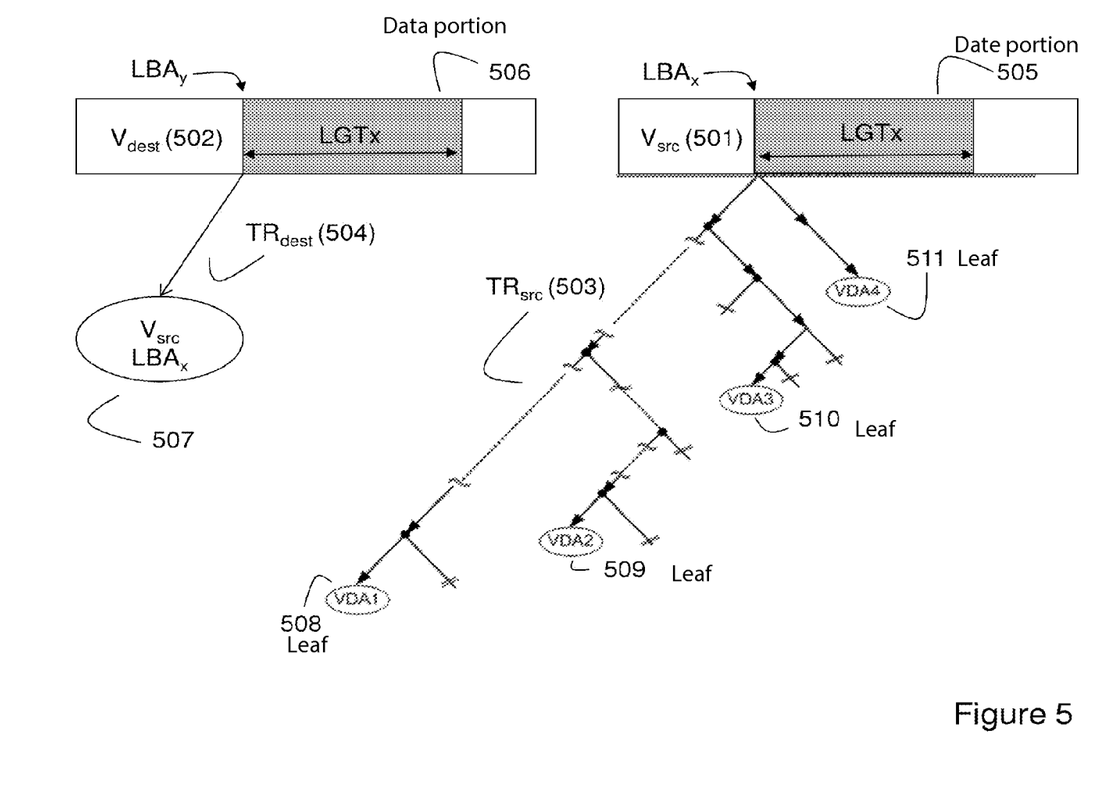
FIG. 5 schematically illustrates an exemplary mapping of addresses related to source and destination logical volumes into addresses related to physical storage space in accordance with certain embodiments of presently disclosed subject matter.

FIG. 5 schematically illustrates an exemplary mapping of addresses related to source and destination logical volumes into addresses related to physical storage space, and further details the move operation detailed with reference to FIG. 4.

The source logical volume $V_{src}$ (501) is provided with assigned mapping tree $TR_{src}$ (503) configured to map, at least, between contiguous ranges of addresses related to the data portion 505 in the source logical volume and ranges of addresses related to corresponding physical address space. The data portion 505 is characterized by offset $LBA_x$ and length $LGT_x$. The exemplified mapping tree $TR_{src}$ comprises four leaves (508-511), the values associated with these leaves indicate respective ranges of addresses related to the physical address space and corresponding to the data portion.

The destination logical volume $V_{dest}$ (502) is provided with assigned mapping tree $TR_{dest}$ (504) configured to map, at least between contiguous ranges of addresses related to the data portion 506 in the destination logical volume and ranges of addresses related to corresponding physical address space. The data portion 506 is the data portion 505 upon moving to the destination logical volume. The data portion 506 is characterized by offset $LBA_y$ and length $LGT_x$.

Responsive to a move command MOVE ($V_{dest}$, $LBA_y$, $V_{src}$, $LBA_x$, $LGT_x$) the destination mapping tree $TR_{dest}$ is configured to include a leaf 507. This leaf corresponds to the moved data portion with the offset $LBA_y$ and the length $LGT_x$, and the value associated with said leaf indicates the source logical volume $V_{scr}$ and the offset $LBA_x$ of the data portion 505 before moving. The leaves 508-511 are configured to bear special marks (not illustrated) indicative that the respective logical addresses in the source volume are unavailable to a client.

Thus, the data portion 505 has been virtually moved from the source logical volume to the destination logical volume in a single, atomic operation, by means of a mere manipulation of metadata and without physical copying of data in the storage system.

Optionally, the moved data portion can replace data comprised in the destination volume prior to receiving the move command MOVE ($V_{dest}$, $LBA_y$, $V_{src}$, $LBA_x$, $LGT_x$) and mapped by the destination mapping tree $TR_{dest}$ accordingly. In this case, upon receiving the MOVE command, the mapping tree is reconfigured so that the leaf 507 replaces any other leaves related to the data range characterizing the moved data portion with the offset $LBA_y$ and the length $LGT_x$.

Mapping between addresses in a destination logical volume and addresses related to physical address space with the help of referenced data structure assigned to a source logical volume is referred to hereinafter as indirect mapping. A process of serving a request with the help of indirect mapping is referred to hereinafter as indirect addressing.

Thus, in accordance to certain embodiments of the currently presented subject matter, responsive to a move command MOVE ($V_{dest}$, $LBA_y$, $V_{src}$, $LBA_x$, $LGT_x$), there is provided an atomic operation comprising indirect mapping the moved data portion to the addresses related to physical address space with the help of at least one entry associated with the source data portion in the source mapping data structure, and configuring this entry in the source data structure $DS_{src}$, to bear a special mark indicative that the entry (e.g. the leaf in the mapping tree) is unavailable to a client.

In accordance with certain embodiments of the presently disclosed subject matter, the mapping data structures in the source and in the destination volumes can be further configured to bear an indication of a number of mapping trees indirectly mapping a given data portion in different logical volumes to the same contiguous range of addresses related to physical address space. This indication, indicative for a given extent of the number of separate instances of the extent indirectly mapped to the addresses related to physical address space corresponding to the extent is referred to hereinafter as multiple reference indication (MRI). The indication can be provided with the help of a reference counter associated with the source volume and one or more destination volumes and/or data portions in the volumes. The reference counter can be implemented as a separate data structure or, fully or partly, integrated with respective mapping data structures. By way of non-limiting example, the MRI value can be assigned to each leaf corresponding to the given extent in source and destination mapping trees, and be updated upon extent modification(s).

For a given extent, the reference counter is indicative of, at least, all leaves in the source tree bearing indication that there is at least one destination tree $TR_{dest}$ mapping respective data portions to the same contiguous range of addresses related to physical address space. The reference counter can further comprise a data structure (e.g. a table) having entries corresponding to the extents and indicative of the MRI value. For example, the entry can contain the following fields for a given extent moved to three destination volumes:

$V_{src}$; $LBA_x$; Length (in blocks or in sections); MRI=3;
$V_{dest1}$, $LBA_{y1}$; $V_{dest2}$, $LBA_{y2}$; $V_{dest3}$, $LBA_{y3}$; etc.

Every time the given extent is migrated, the MRI value in the corresponding entry in the table is updated to indicate the amount of indirectly mapped separate instances of the given extent. Optionally, the reference counter table can include only entries with non-zero MRI value.

A read request READ ($V_{dest}$, $LBA_y$+K, P) addressed to a data range with length P and offset K within the moved data portion 506, will be served with the help of the destination mapping tree 504. The reference in the leaf 507 addresses to the source mapping tree $TR_{src}$ for further translation. The source mapping tree $TR_{src}$ will provide addresses related to physical address space and corresponding to data range ($LBA_x$+K, P) in the data portion 505 before moving to destination logical volume.

A write request addressed to the instance in the destination volume WRITE ($V_{dest}$, $LBA_y$, $LGT_x$) replaces the reference to $DS_{src}$ in the destination mapping structure $DS_{dest}$ by the destination physical address allocated for new/overwriting data and reduces by one respective MRI value in the reference counter.

Figure 6:
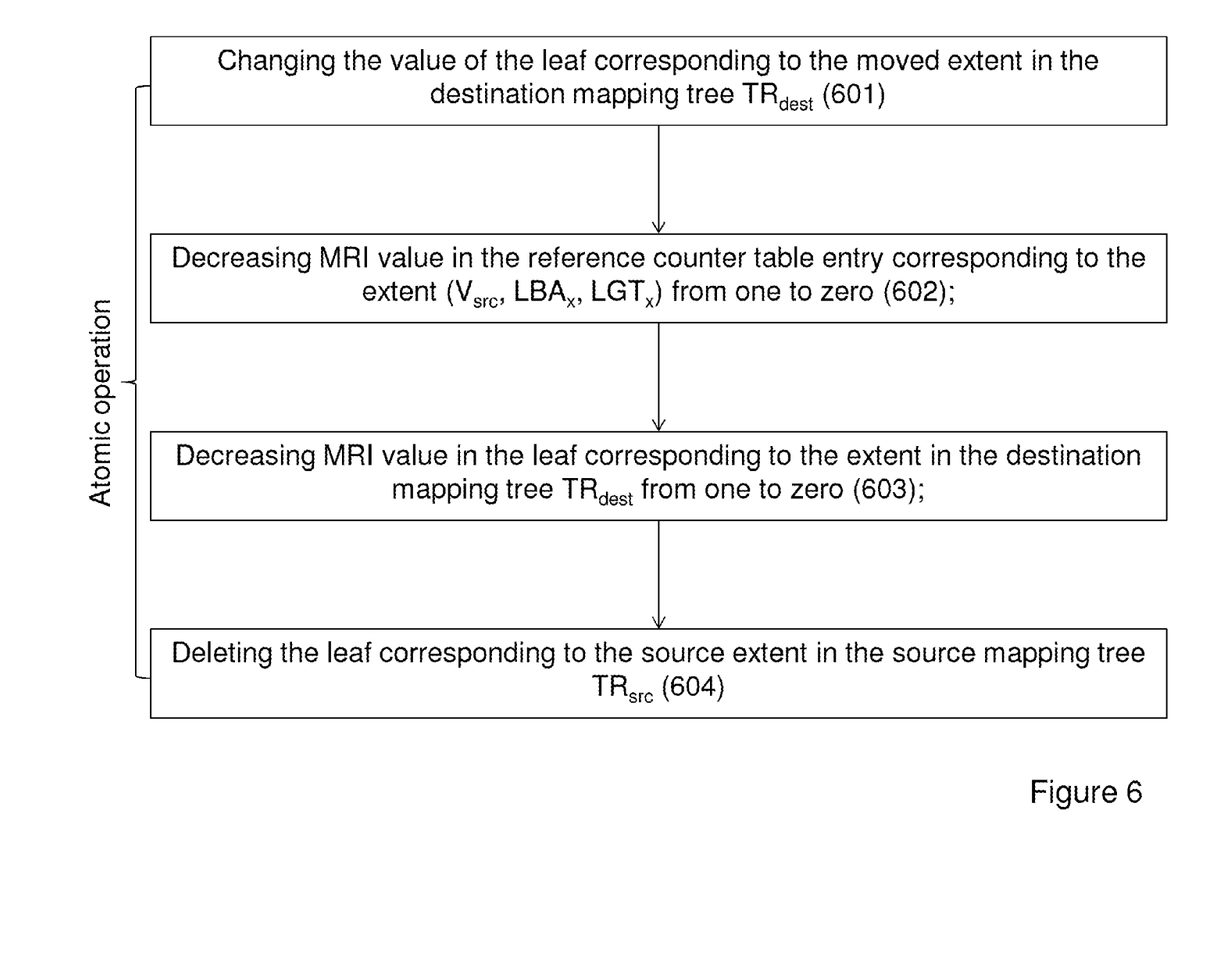
FIG. 6 illustrates a generalized flow diagram of handling deleting the moved address range in the source volume in accordance with certain embodiments of presently disclosed subject matter.

Referring to FIG. 6, there is illustrated a generalized flow diagram of deleting a source data portion after move operation.

It is to be noted that, resulting the MOVE operation, logical addresses corresponding to the source data portion are unavailable for client access, however can be configured as available for commands issued by a storage system (e.g. by a background process). For example, upon successful move of the data portion to one or more destination volumes, the storage system can issue a command to delete the source data portion in the source volume.

For purpose of illustration only, the following description is provided for write requests addressed to the address range in the source volume corresponding to the entire extent moved to a single destination volume. Those skilled in the art will readily appreciate that the presently disclosed subject matter can be implemented, likewise, when there are several instances of the extent moved to several destination volumes.

Upon receiving by the source volume a delete command DELETE ($V_{src}$, $LBA_x$, $LGT_x$), the following steps 601-604 are provided as a single atomic operation, i.e. operation that either succeeds or fails in its entirety and not in a partial way. The atomic operation comprises:

changing the value of the leaf corresponding to the moved extent in the destination mapping tree $TR_{dest}$ by replacing the reference to the source volume with the physical address range corresponding to the extent in the source mapping tree $TR_{src}$ (601);

decreasing MRI value in the reference counter table entry corresponding to the extent ($V_{src}$, $LBA_x$, $LGT_x$) from one to zero (and, optionally, removing the entry as MRI=0) (602);

decreasing MRI value in the leaf corresponding to the extent in the destination mapping tree $TR_{dest}$ from one to zero (603);

deleting the leaf corresponding to the source extent in the source mapping tree $TR_{srct}$ (604).

In the illustrated case of a single destination volume, upon completing the atomic operation, the indirect mapping has been removed and the destination mapping tree points directly to the respective physical address ranges.

Likewise, in a case of several instances of the extent moved to several destination volumes, the destination mapping tree $TR_{dest}$ in a first destination volume $V_{dest}$ can be configured to directly point to the physical address corresponding to the moved extent (and previously mapped via the source tree $TR_{src}$, while the leaves corresponding to other instances of the moved extent can be re-configured to refer to the first destination volume $V_{dest}$ instead of the source volume $V_{src}$, and MRI values can be updated accordingly. The respective leaf in the source tree can be deleted as the value of MRI corresponding to the leaf becomes equal to zero.

Figure 7A:
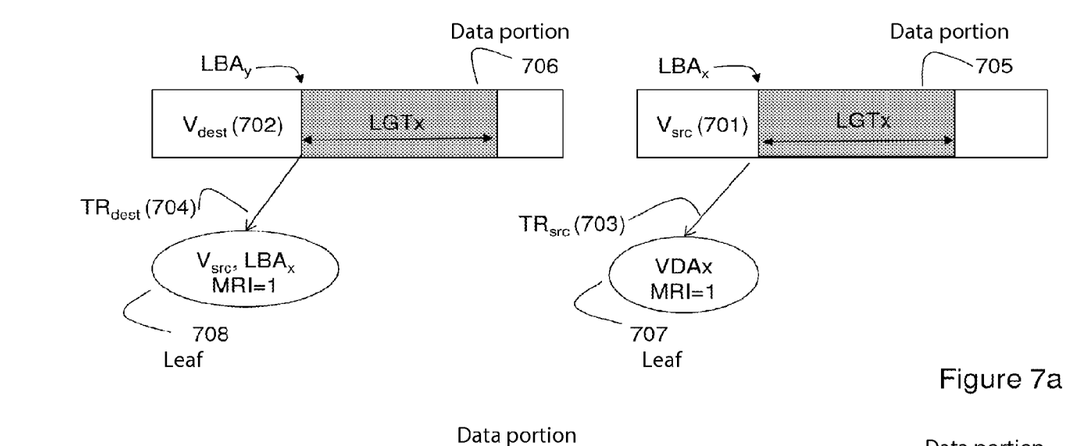
FIGS. 7a-7b schematically illustrate the process of write requests handling detailed with reference to FIG. 6.
Figure 7B:
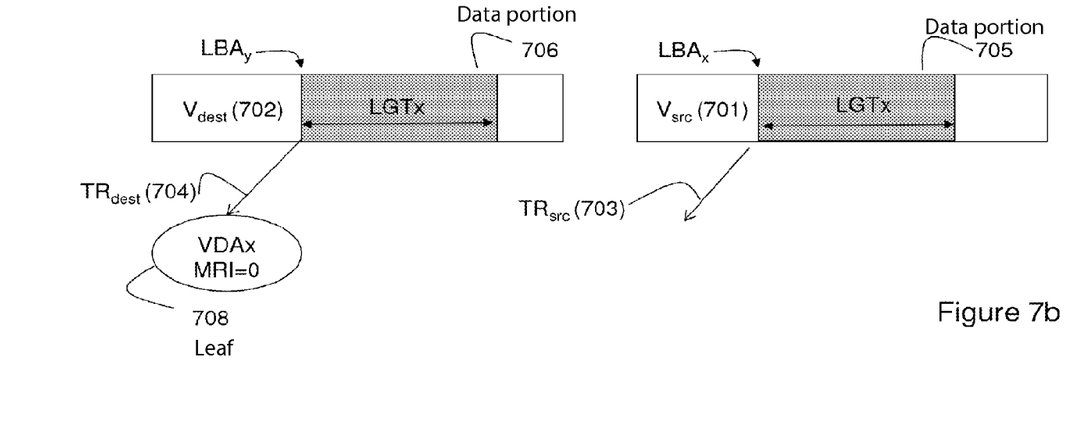

FIGS. 7a and 7b schematically illustrate the process detailed with reference to FIG. 6.

FIG. 7a schematically illustrates the non-limiting example in which the VUA source extent 705 in the source volume 701 has been moved and is represented as extent 706 in the destination volume 702. The source mapping tree $TR_{src}$ (703) maps between contiguous range of VUA addresses corresponding to ($LBA_x$, $LGT_x$) and VDA addresses related to the extent 705. The exemplified mapping tree $TR_{src}$ comprises a single leaf 707 indicative of $VDA_x$ of range of VDA addresses corresponding to the extent.

The destination mapping tree $TR_{dest}$ (704) maps between VUA and VDA addresses related to the moved extent 706. The exemplified mapping tree $TR_{src}$ comprises a single leaf 708, while the value associated with said leaf indicates the source logical volume $V_{scr}$ and the offset $LBA_x$ of the extent 705 to be used for mapping.

Both leaves 707 and 708 bear MRI value MRI=1, indicating that there is one mapping tree indirectly mapping the instances of the extent to the same contiguous range of VDA addresses.

FIG. 7b schematically illustrates the mapping trees illustrated in FIG. 7a and is further modified in response to the delete command DELETE ($V_{src}$, $LBA_x$, $LGT_x$). Leaf 708 has the value $VDA_x$ corresponding to the VDA offset of the extent in the source mapping tree $TR_{src}$ and bears MRI value reduced to zero, indicating that there are no mapping trees indirectly mapping the instances of the extent to the same contiguous range of VDA addresses. MRI value of the leaf 707 also has been reduced to zero and the leaf is deleted.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

Those skilled in the art will readily appreciate that various modifications and changes can be applied to the embodiments of the presently disclosed subject matter as hereinbefore described without departing from its scope, defined in and by the appended claims.

The invention claimed is:

1. A method of moving a source data portion, the method comprising:

receiving, by a storage system, a moving command for moving the source data portion from a source logical address range within a source logical volume to at least one destination logical address range within at least one destination logical volume;

wherein the source logical volume is associated with a source mapping data structure for mapping between first logical addresses within the source logical volume and first physical addresses within a physical address space of the storage system;

wherein the source mapping data structure comprises at least one first entry for mapping between the source logical address range and a physical address range that stores the source data portion and belongs to the physical address space;

wherein the at least one destination logical volume is associated with a destination mapping data structure for mapping between second logical addresses within the at least one destination logical volume and second physical addresses in the physical address space;

in response to the move command:

configuring, by the storage system, the destination mapping data structure to comprise at least one second entry for associating said at least one destination logical address range with a reference to said at least one first entry in the source mapping data structure, wherein the configuring of the destination mapping data structure provides at least one moved data portion without physically copying data of the source data; wherein the reference to said at least one first entry is indicative of the source logical address range; configuring said at least one first entry in the source mapping data structure to bear an indication that the source logical address range is unavailable to a client;

wherein the method further comprising, upon receiving a request related to said at least one moved data portion:
 looking up the destination mapping data structure for the at least one destination logical address range, so as to retrieve the reference to the at least one first entry;
 looking up the source mapping data structure for the source logical address indicated in the reference; and
 retrieving the physical address range that stores the source data portion;

wherein the method further comprising:
 responsive to a write request for writing new data to said source data portion, providing an atomic operation, said atomic operation comprising:
  assigning a new range of addresses related to the physical address space for the new data to be destaged;
  updating said at least one first entry in the source mapping structure to map between the source logical address range and said new range of addresses related to the physical address space; and
 updating said at least one second entry in the destination mapping structure to map between said at least one destination logical address range and the physical address range that was comprised, before the updating of said at least one first entry, in said at least one first entry in the source data structure, and removing the reference to the at least one first entry;
 wherein the source mapping structure is a tree and wherein a path followed from a tree root to a leaf is represented as a string of zeros and ones depending on right or left branches comprised in the path; wherein an offset of the source logical address range within a given logical group is calculated in accordance with a path followed from the tree root to a leaf by calculating a sum, over index i that ranges between zero and d−1 of $r_i$ multiplied by two by a power of (M−i−1); wherein M is a power of two in a maximal number of admissible addresses in the given logical group, d is a depth of the leaf, values of index i that range between zero and d−1 are successive nodes in the tree leading to the leaf, and $r_i$ is a value equal to zero for one-side branching and equal to one for another side branching.

2. The method of claim 1 wherein the destination mapping data structure is configured as a destination ordered mapping tree, and wherein said at least one second entry in the destination mapping data structure is implemented as a leaf of said destination mapping tree, wherein the method comprising upon receiving the move command, configuring said leaf to comprise the reference to said at least one first entry.

3. The method of claim 1, wherein the storage system is coupled to at least one host comprising a plurality of virtual machines and wherein the source logical volume and the at least one destination logical volume are associated with different virtual machines.

4. The method of claim 3 wherein the source mapping structure is configured as a source ordered mapping tree, and wherein said at least one first entry in the source mapping structure is implemented as a leaf of the source ordered tree.

5. The method of claim 4 further comprising associating the leaf in the source ordered mapping tree and the leaf in the destination ordered mapping tree with a multiple-reference indication indicative of a number of moved data portions originated from the source data portion, said portions mapped to addresses related to physical address space with the help of said leaves.

6. The method of claim 1 further comprising associating said source data portion with a multiple-reference indication indicative of a number of moved data portions originated from said source data portion, wherein the moved data portions use the reference to said at least one first entry in the source mapping data structure for mapping into addresses in the physical address space.

7. The method of claim 6 wherein said multiple-reference indication is provided with the help of a reference counter comprising the number of moved data portions and associated with the source mapping data structure and with the destination mapping data structure.

8. The method of claim 7 further comprising:
 responsive to a command to delete said source data portion, providing an atomic operation, said atomic operation comprising:
  updating said at least one second entry in the destination mapping structure to map between said at least one destination logical address range and the physical address range that stored the source data portion;
  deleting said at least one first entry in the source mapping structure; and
  updating the value of multiple-reference indication.

9. The method of claim 7 further comprising:
 responsive to a write request for writing new data to said at least one moved data portion, providing an atomic operation, said atomic operation comprising:
  assigning a new range of addresses related to the physical address space for the new data to be destaged;
  updating said at least one second entry in the destination mapping structure to map between said at least one destination logical address range and said new range of addresses related to the physical address space; and
  reducing by one the value of the multiple-reference indication.

10. The method of claim 1 wherein the configuring of the destination mapping data structure provides the at least one moved data portion without altering addresses related to the physical address space and corresponding to said source data portion and said at least one moved data portion.

11. A storage system comprising a plurality of physical storage devices constituting a physical storage space and controlled by a plurality of storage control devices constituting a storage control layer, wherein the storage control layer is configured to:
 receive a move command for moving a source data portion from a source logical address range within a source logical volume to at least one destination logical address range within at least one destination logical volume;
 wherein the source logical volume is associated with a source mapping data structure for mapping between first logical addresses within the source logical volume and first physical addresses within the physical address space;
 wherein the source mapping data structure comprises at least one first entry—for mapping between the source logical address range and a physical address range that stores the source data portion and belongs to the physical address space; and wherein the at least one destination logical volume is associated with a destination mapping data structure for mapping between second logical addresses within the at least one destination logical volume and second physical addresses in the physical address space;

wherein said storage control layer is further configured, in response to the move command: (i) to configure the destination mapping data structure to comprise at least one second entry for associating said at least one destination logical address range with a reference to said at least one first entry in the source mapping data structure, wherein the configuring of the destination mapping data structure provides at least one moved data portion without physically copying data of the source data portion; (ii) to configure said at least one first entry in the source mapping data structure to bear an indication that the source logical address range is unavailable to a client;

wherein the reference to said at least one first entry is indicative of the source logical address range, wherein the storage system is further configured to, upon receiving a request related to said at least one moved data portion:

look up the destination mapping data structure for the at least one destination logical address range, so as to retrieve the reference to the at least one first entry;

look up the source mapping data structure for the source logical address indicated in the reference; and retrieve the physical address range that stores the source data portion;

wherein the storage system is further configured to:

responsive to a write request for writing new data to said source data portion, provide an atomic operation, said atomic operation comprising:

assigning a new range of addresses related to the physical address space for the new data to be destaged;

updating said at least one first entry in the source mapping structure to map between the source logical address range and said new range of addresses related to the physical address space; and updating said at least one second entry in the destination mapping structure to map between said at least one destination logical address range and the physical address range that was comprised, before the updating of said at least one first entry, in said at least one first entry in the source data structure, and removing the reference to the at least one first entry; and wherein the source mapping structure is a tree and wherein a path followed from a tree root to a leaf is represented as a string of zeros and ones depending on right or left branches comprised in the path; wherein an offset of the source logical address range within a given logical group is calculated in accordance with a path followed from the tree root to a leaf by calculating a sum, over index i that ranges between zero and d−1 of $r_i$ multiplied by two by a power of (M−i−1); wherein M is a power of two in a maximal number of admissible addresses in the given logical group, d is a depth of the leaf, values of index i that range between zero and d−1 are successive nodes in the tree leading to the leaf, and $r_i$ is a value equal to zero for one-side branching and equal to one for another side branching.

12. The storage system of claim 11 wherein the destination mapping data structure is configured as a destination ordered mapping tree, and wherein said at least one second entry in the destination mapping data structure is implemented as a leaf of said destination mapping tree, wherein said leaf is configured, upon receiving the move command, to comprise the reference to said at least one first entry.

13. The storage system of claim 12 wherein the leaf in the source ordered mapping tree and the leaf in the destination ordered mapping trees are associated with a multiple-reference indication indicative of a number of moved data portions originated from the source data portion, said portions mapped to addresses related to physical address space with the help of said leaves.

14. The storage system of claim 11, wherein the storage system is coupled to at least one host comprising a plurality of virtual machines, wherein the source logical volume and the at least one destination logical volume are associated with different virtual machines.

15. The storage system of claim 14 wherein the source mapping data structure is configured as a source ordered mapping tree, and wherein said at least one first entry in the source mapping structure is implemented as a leaf of the source ordered tree.

16. The storage system of claim 11 wherein the storage control layer is further configured to associate said source data portion and said at least one moved data portion with a multiple-reference indication indicative of a number of moved data portions originated from said source data portion and use the reference to said at least one first entry in the source mapping data structure.

17. The storage system of claim 16, wherein the storage control layer is further configured to provide a reference counter associated with the source mapping data structure and with the destination mapping data structure and configured to provide said multiple-reference indication.

18. The storage system of claim 16, wherein the storage control layer is further configured to provide an atomic operation responsive to a command to delete said source data portion, said atomic operation comprising:

updating said at least one second entry in the destination mapping structure to map between said at least one destination logical address range and the physical address range that stored the source data portion; and deleting said at least one first entry in the source mapping structure;

updating the value of multiple-reference indication associated with said at least one moved data portion.

19. The storage system of claim 16, wherein the storage control layer is further configured to provide an atomic operation responsive to a write request related to said at least one moved data portion, said atomic operation comprising:

assigning a new range of addresses related to physical address space for new data to be destaged;

updating said at least one second entry in the destination mapping structure to map between said at least one destination logical address range and said new range of addresses related to physical address space; and updating the value of the multiple-reference indication.

20. A computer program product comprising a non-transitory computer useable medium having computer readable program code embodied therein for moving a source data portion, the computer program product comprising:

computer readable program code for causing the computer to:

receive, by a storage system, a move command for moving the source data portion from a source logical address range within a source logical volume to at least one destination logical address range within at least one destination logical volume;

wherein the source logical volume is associated with a source mapping data structure for mapping between first logical addresses within the source logical volume and first physical addresses within a physical address space of the storage system;

wherein the source mapping data structure comprises at least one first entry for mapping between the source logical address range and a physical address range that stores the source data portion and belongs to the physical address space;

wherein the at least one destination logical volume is associated with a destination mapping data structure for mapping between second logical addresses within the at least one destination logical volume and second physical addresses in the physical address space;

configure, in response to the move command, the destination mapping data structure to comprise at least one second entry for associating said at least one destination logical address range with a reference to said at least one first entry in the source mapping data structure, wherein the configuring of the destination mapping data structure provides at least one moved data portion without physically copying data of the source data portion; and to configuring said at least one first entry in the source mapping data structure to bear an indication that the source logical address range is unavailable to a client;

wherein the reference to said at least one first entry is indicative of the source logical address range, wherein the computer readable program code if for causing the computer to, upon receiving a request related to said at least one moved data portion:

look up the destination mapping data structure for the at least one destination logical address range, so as to retrieve the reference to the at least one first entry;

look up the source mapping data structure for the source logical address indicated in the reference; and retrieve the physical address range that stores the source data portion;

wherein the computer readable program code if for causing the computer to responsive to a write request for writing new data to said source data portion, provide an atomic operation, said atomic operation comprising:

assigning a new range of addresses related to the physical address space for the new data to be destaged;

updating said at least one first entry in the source mapping structure to map between the source logical address range and said new range of addresses related to the physical address space; and updating said at least one second entry in the destination mapping structure to map between said at least one destination logical address range and the physical address range that was comprised, before the updating of said at least one first entry, in said at least one first entry in the source data structure, and removing the reference to the at least one first entry;

wherein the source mapping structure is a tree and wherein a path followed from a tree root to a leaf is represented as a string of zeros and ones depending on right or left branches comprised in the path; wherein an offset of the source logical address range within a given logical group is calculated in accordance with a path followed from the tree root to a leaf by calculating a sum, over index i that ranges between zero and d−1 of $r_i$ multiplied by two by a power of (M−i−1); wherein M is a power of two in a maximal number of admissible addresses in the given logical group, d is a depth of the leaf, values of index i that range between zero and d−1 are successive nodes in the tree leading to the leaf, and $r_i$ is a value equal to zero for one-side branching and equal to one for another side branching.

* * * * *